US005726897A

United States Patent [19]

Tammi et al.

[11] Patent Number: 5,726,897

[45] Date of Patent: Mar. 10, 1998

[54] MAIL ASSEMBLY SYSTEM AND METHOD

[75] Inventors: Christian E. Tammi, El Dorado Hills; Daniel M. Saldana, Rancho Cordova; Marc J. Fagan, Davis, all of Calif.

[73] Assignee: United States Computer Services, Sacramento, Calif.

[21] Appl. No.: 682,367

[22] Filed: Jul. 17, 1996

[51] Int. Cl.$^6$ .................... G06F 19/00

[52] U.S. Cl. .................... 364/478.09; 364/464.18; 364/478.15

[58] Field of Search .................... 364/478.11, 478.12, 364/478.14, 478.15, 478.09, 464.11, 464.14, 464.18, 464.2; 235/375; 270/58.01, 1.01, 1.03

[56] References Cited

U.S. PATENT DOCUMENTS

| | | | |
|---|---|---|---|
| 4,797,832 | 1/1989 | Axelrod et al. | 364/464.18 |
| 4,800,504 | 1/1989 | Durst, Jr. et al. | 364/478.09 |
| 4,800,505 | 1/1989 | Axelrod et al. | 364/478.12 |
| 4,800,506 | 1/1989 | Axelrod et al. | 364/464.18 X |
| 4,852,013 | 7/1989 | Durst, Jr. et al. | 364/478.09 |
| 4,853,869 | 8/1989 | Durst, Jr. et al. | 364/464.18 X |

*Primary Examiner*—Joseph Ruggiero
*Attorney, Agent, or Firm*—James M. Ritchey

[57] ABSTRACT

A mail assembly system and method which utilizes non-print post processing data embedded within the mail statement print data of a data record to carry out post processing operations for a plurality of mailing pieces. The data record is provided to a printer system which sequentially outputs a plurality of printed mail statements according to the statement print data. A wedge or splitter device retrieves the post processing data from the print data stream, and provides the post processing data to a system controller computer. As each printed mail statement is transferred from the printer system to a post processing system, the post processing data for each mailing piece is correlated or matched with each mail statement, and post processing operations are accordingly carried out. The invention thus avoids the use of printed identification codes on mail statements or other control documents for accessing post processing data from a data record.

41 Claims, 5 Drawing Sheets

MAIL ASSEMBLY SYSTEM AND METHOD

BACKGROUND OF THE INVENTION

1. Field of the invention.

This invention pertains generally to systems and methods for the preparation and processing of large numbers of mail pieces or items to be mailed. More particularly, a mail assembly and processing system and method are disclosed wherein post processing data for a plurality of mailing pieces is embedded within mail statement print data in a data record as non-printable character information. The embedded post-processing data is captured or retrieved from the print data and utilized by a system controller computer to control post processing operations for the plurality of mail statements whereby a plurality of mailing pieces are assembled. Thus, the subject invention eliminates the need for printing and scanning of machine-readable codes placed on the printed statements in order to access post processing data for assembly of mailing pieces.

2. Description of the Background Art

Large scale mailing operations, such as periodic or monthly billings and mass advertising, involve the preparation of large numbers of mailing pieces for delivery to large numbers of individual mail recipients. Each mailing piece generally comprises an outer mailing envelope which contains a printed mail statement or bill, various types and quantities of inserts such as advertising materials, notices, flyers, coupons and Pike items, and one or more return envelopes. The printed mail statement may comprise one or more pages or sheets. During a mailing operation, following the printing of the mail statements, a variety of post processing operations are generally performed in order to assemble finished mailing pieces. The post processing operations may include, for example, the organizing, collating, and folding of the printed mail statements, inclusion of inserts with the mail statements, envelope insertion, envelope sealing, postage metering, and other operations.

Large scale or bulk mail processing operations are generally carried out under computer control to expedite the assembly of the mailing pieces and to reduce errors. The physical assembly of the mailing pieces is directed by the controlling computer according to a data record which has been previously prepared and stored in a database. The data record will typically include the information to be printed for each mail or billing statement, as well as a variety of data related to the post processing operations which occur subsequent to the printing of the statements. The post processing data may include, for example, information regarding the number of pages in each statement, the sequence number of each statement in the order processed, selective or dynamic insert enclosure information for each statement, mailing tray and mailing bundle location, zip code indexing information, and the like. The computer which controls the mail assembly operation directs the post processing for each mailing piece according the post processing data in the data record.

In background art mail processing systems, the post processing data for each mailing piece is generally accessed or obtained from the data record by the computer controller by means of identification codes which are printed on each statement in the form of a bar code or other machine readable indicia. After the printing of the statements with printed identification codes thereon and before and/or during the post processing operations, the computer accesses the post processing data for each mailing piece by scanning or detecting the printed codes on the statements, and then accessing the corresponding post processing data from the data record according to the scanned codes. Thus, in background art mail preparation systems, each mail statement acts as a control document for the post processing operations for the assembly of each mailing piece, with the printed identification code on each statement allowing access to the post processing data necessary for the mailing piece to be assembled. An example of a standard background art mail preparation system as described above is provided by U.S. Pat. No. 4,800,505 to Axelrod et al.

The aforementioned background art use of machine readable identification codes, which are printed on mail statements in order to access post processing data from a data record, is plagued with numerous deficiencies. A particular disadvantage associated with printed identification codes on the mail statements is the impersonalized, unaesthetic appearance imparted to the mail statements by the presence of the printed codes, which decreases advertising effectiveness, takes up space on the printed mail statements which could otherwise be put to better uses, and generally increases customer dissatisfaction. Another problem associated with the printing and scanning of machine readable identification codes is that it reduces the speed at which the overall mail assembly operation can proceed. Under computer control, the assembly of mailing pieces can proceed very quickly. Printed machine readable codes, however, can only be accurately scanned or detected below a certain threshold speed, above which the mail assembly operation cannot proceed because of code scanning errors. The time involved in the step of scanning each statement for printed codes further lengthens the processing time for each mailing piece. Another disadvantage associated with the printed identification codes used in the background art is that errors in mailing piece assembly result from misreading of codes due to smudging or misprinting of the codes and/or smudging or other contamination on the surfaces of the detection optics used for code scanning. These errors cause incorrectly assembled mailing pieces which irritate mail recipients and cause inconveniences, delays and additional cost to the mail preparation process.

Accordingly, there is a need for a mail assembly system and method which does not require the use of printed codes on the mail or billing statements in order to access post processing information, and thus avoids the aforementioned problems. The subject invention satisfies this need, as well as others, and generally overcomes the deficiencies found in the background art.

The foregoing information reflects the state of the art of which the applicant is aware and is tendered with the view towards applicant's acknowledged duty of candor in disclosing information which may be pertinent in the examination of this application. It is respectfully stipulated, however, that the foregoing information does not teach or render obvious applicant's claimed invention.

SUMMARY OF THE INVENTION

An object of the invention is to provide a mail assembly system and method which does not require the printing of machine-readable codes onto mail statements or other control documents in order to carry out mail post processing operations.

Another object of the invention is to provide a mail assembly system and method which does not require the scanning or detection of printed codes on mail statements or other control documents in order to carry out mail post processing operations.

Another object of the invention is to provide a mail assembly system and method wherein post processing data for mailing pieces is embedded within statement print data in a data record in non-printable character format and which is captured or retrieved from the statement print data for use in directing mail post processing operations.

Still another object of the invention is to provide a mail assembly system and method which creates personalized and aesthetic appearing mailing pieces.

Yet another object of the invention is to provide a mail assembly system and method which allows high speed processing of mailing pieces.

Further objects of the invention will be brought out in the following portions of the specification, wherein the detailed description is provided for illustrating the subject invention without placing limits thereon.

Disclosed is a mail assembly system and method wherein non-printable post processing data for a plurality of mailing pieces is embedded within mail statement print data and is retrieved from the print data stream and utilized for post processing mailing pieces.

In its most general terms, the invention comprises data storage means containing stored data records for a plurality of mailing pieces according to the mailing operation to be carried out with the mail assembly system of the invention. The stored data records comprise mail or billing statement print data or printed sheet image data for a plurality of statements, and post processing data, embedded within the statement print data in non-printable character format, for the plurality of mailing pieces to be assembled with the printed mail statements. Printer means, interfaced with the data storage means, are provided for outputting a plurality of printed mail statements according to the statement print data in the stored data records. Means for retrieving, splitting or otherwise recovering the embedded post processing data from the statement print data are included with the invention. Means for matching or correlating the plurality of printed statements with the corresponding post processing data are furnished with the invention. The mail assembly system is preferably directed by computer means for system control, with the computer means being interfaced for communication with the printer means, the retrieving means, the data storage means, and the matching means. Preferably, post processing means are provided with the invention for post processing of the plurality of printed mail statements into a plurality of assembled mailing pieces. Means for physically transferring printed mail statements to the post processing means from the printer means are also preferably included with the invention.

By way of example and not of limitation, the data storage means comprises conventional data storage means suitable for retaining digitized information for large mail printing and mail assembly operations. The statement print data is generally stored in the form of printed sheet images for mail or billing statements in the order in which the sheets of the statements will be sequentially printed. The post processing data is stored as non-printable character information which is included or embedded within the statement print data and identifiable therefrom by specific code sequences which indicate the presence of the post processing data. Preferably, the post processing data is located at the "boundaries" of the print data for each mail statement, with the post processing data generally associated with the beginning of the print data for each statement. The post processing data includes information regarding the number of pages in each statement, the sequence number of each statement in the order processed, selective or dynamic insert enclosure information for each statement, mailing tray and mailing bundle location, zip code indexing information, and other information which may be utilized in processing each of the plurality of mail statements into a plurality of assembled mailing pieces ready for mailing to recipients.

The printer means preferably comprises a conventional high volume, high speed printer or printer system capable of rapidly outputting large numbers of printed mail statements. The printer means receives a stream of print data, together with the embedded post processing data, from the data storage means via communication interface. The printer means sequentially outputs a plurality of printed sheets which comprise a plurality of sequentially outputted printed mail statements.

The retrieving means preferably comprises a "wedge" or splitter/recombiner device, associated with the printer means, for retrieving the embedded post processing data from the statement print data stream and directing the post processing data to the computer means for system control.

The computer means preferably comprises a system controller computer or microprocessor, which receives the post processing data recovered from the print data stream by the retrieving means via communication interface, and which directs post processing operations according to the post processing data.

The matching or correlating means generally comprises means for providing an odd-even numeric assignment to each printed mail statement and means for signaling or informing the computer means of the odd-even numeric assignment for each printed mail statement which exits or clears the printer means. The matching means also preferably comprises means for identifying the last sheet of each mail statement and for informing or signaling the computer means when the last printed sheet of each printed mail statement has exited, cleared, or been outputted from the printer means, and that the next or following printed sheet will be the first printed sheet of a following or subsequent mail statement. The matching means also preferably includes means for verifying the receipt of printed statements by the post processing means.

The matching means utilizes a first type of non-print code sequence commands within the print data stream which identify or indicate the beginning and end of the print data for each statement in the print data stream, or which otherwise identifies the "boundaries" of the mail statements within the print data stream. The matching means also employs a second type of non-print code sequence commands within the print data stream to provide an odd-even numeric assignment to each mail statement.

The means for informing, signaling or indicating to the computer means when the last printed sheet of each mail statement has cleared or exited the printer means, and whether or not each printed mail statement has an odd or even numeric assignment, preferably comprises a finishing interface device, associated with the printer means, which physically transfers, in sequential manner, each printed page or sheet of each mail statement from the printer means to the post processing means. The finishing interface indicates to or signals the computer means, according to the non-print code sequence commands, when the last printed sheet of each mail statement is being transferred or outputted from the printer means to the post processing means, and the odd-even numeric assignment of the mail statement associated with that sheet, allowing the computer means to match or correlate the post processing data received from the retrieving means with the printed mail statements as they are physically transferred or outputted from the printer means to the post processing means.

The verifying means preferably comprises sensor means, interfaced with the control means, for monitoring and verifying the receipt of printed mail or billing statements at one or more points in the post processing means, and corresponding acknowledgment signals, sent by the control means to the printer means, indicating the receipt of the printed statements.

The matching means also preferably comprises programming, associated with the computer means, for performing operations which allow the matching or correlation of each printed mail statement with its corresponding post processing data.

The post processing means preferably comprises a post processing system having one or more conventional or non-conventional collators, buckle folders, envelope insertion apparatus, envelope wetting and sealing apparatus, postage metering devices, and like items associated with post processing of mail statements to form assembled mailing pieces.

Generally, in operation of the mail assembly system comprising the invention, the printer system receives a stream of mail statement print data from the data storage means via standard communication interface, and sequentially generates or outputs a plurality of printed pages or sheets according to the statement print data. The embedded post processing data, which is generally located at the beginning of the printed sheet image data for each mail statement as related above, is split off or retrieved from the stream of statement print data by the splitter device and directed to the computer system controller via conventional communication interface. The printed sheets of the mail statements are sequentially transferred to the post processing system via the finishing interface associated with the printer system. As each printed sheet is transferred to the post processing system by the finishing interface, a signal is sent via communication link to the system controller computer from the finishing interface indicating that a printed sheet has cleared the printer and entered the post processing system. As the final printed sheet of each mail statement clears the finishing interface and enters the post processing system, the finishing interface sends a signal, according to the non-print code sequence at the beginning of the print data for each statement, to the system controller computer indicating that the final sheet of the previous mail statement has entered the post processing system and that the next sheet will be the first sheet of the following mail statement. Also as the final printed sheet of each mail statement clears the finishing interface and enters the post processing system, the finishing interface sends a signal to the system controller computer, according to the non-print code sequence at the boundaries of the print data for each statement, indicating whether or not the next mail statement to be transferred is an odd-numbered or even-numbered mail statement. The system controller computer, upon receiving the signals from the finishing interface, determines or matches the parity of the post processing data received from the splitter device with the parity of the mail statement, and accordingly directs the post processing operations carried out by the post processing system for each mailing piece. The system controller computer monitors the post processing system by sensor means, and upon detection by the sensor means of completed mail statements at one or more points in the post processing system, the system controller sends an acknowledgment or verification signal to the printer.

DETAILED DESCRIPTION OF THE PREFERRED EMBODIMENT

Figure 3:
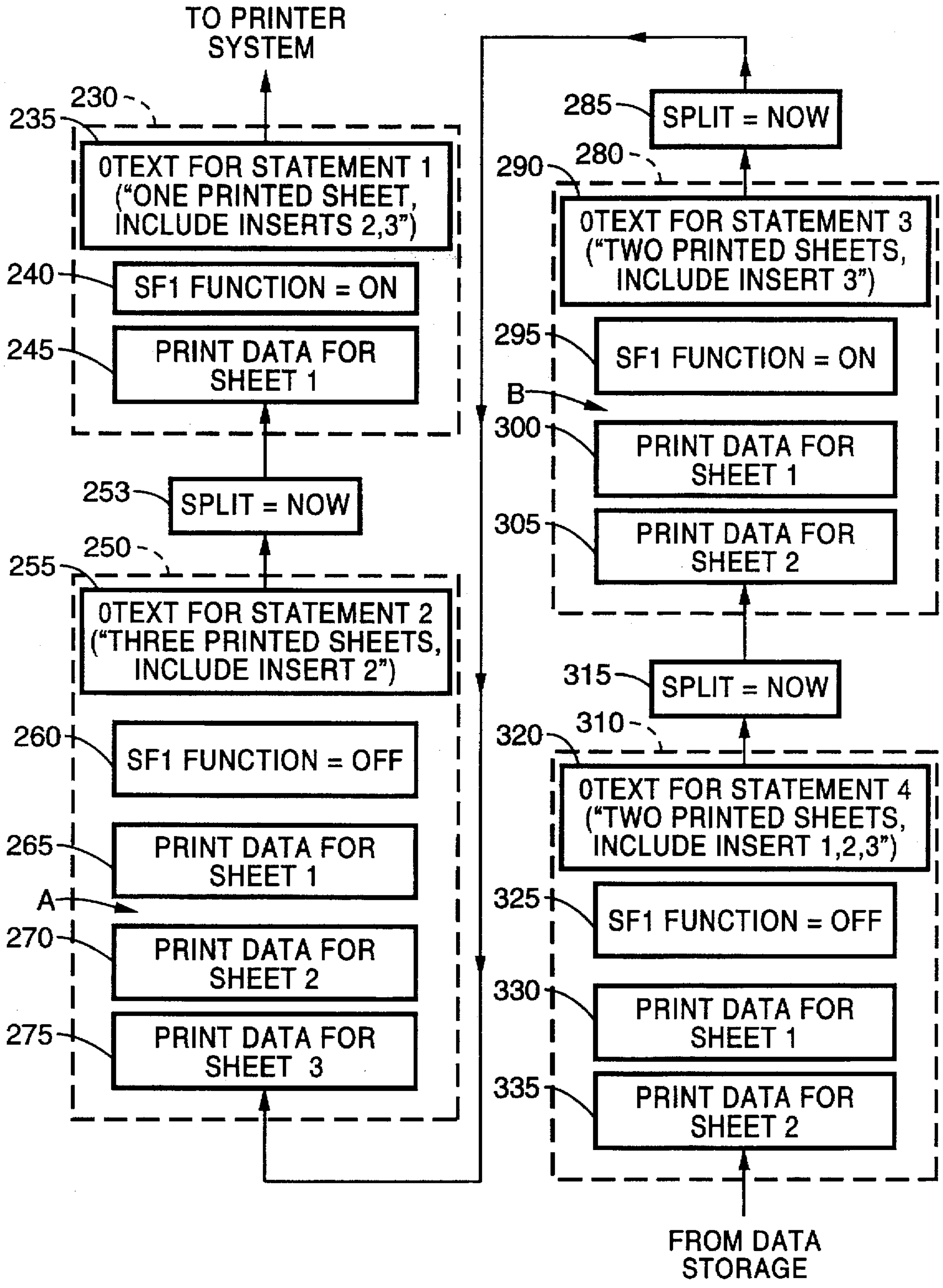
FIG. 3 is a diagrammatic representation of a print data stream in accordance with the invention for four statements having varying numbers of sheets.
Figure 4:
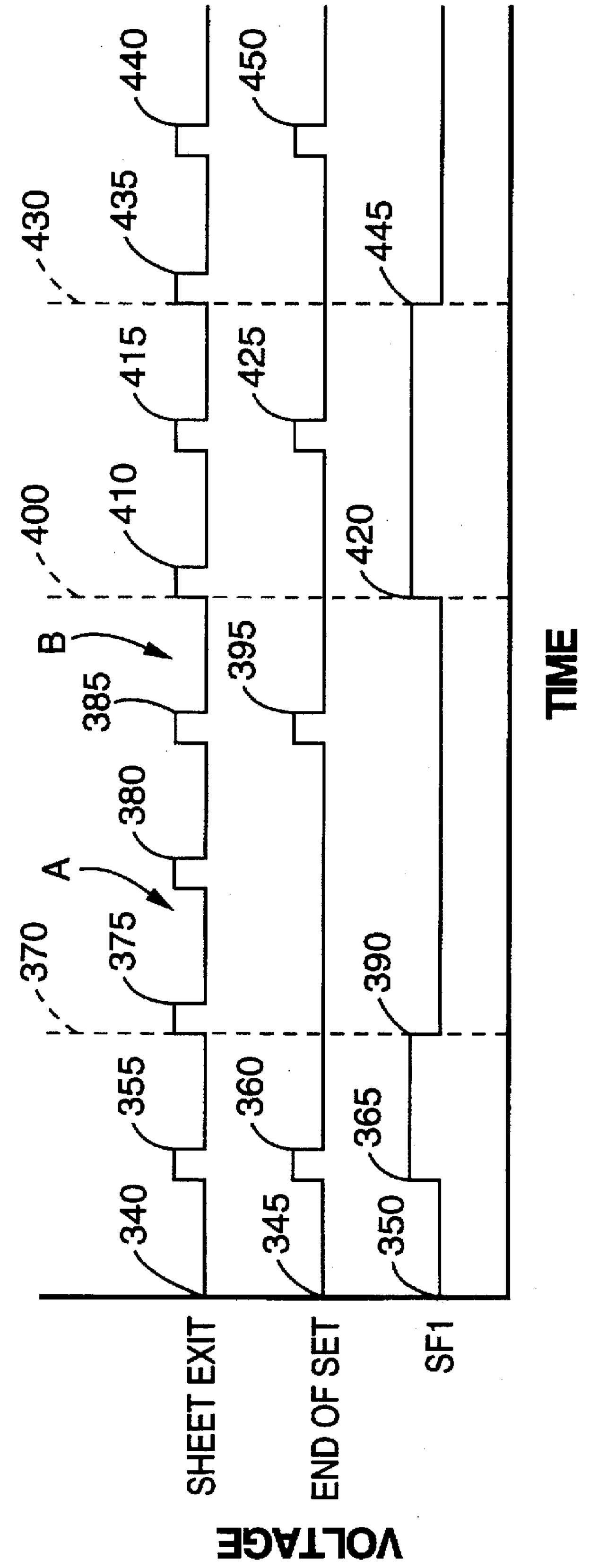
FIG. 4 provides a graphic representation of the signal output as voltage versus time from the finishing interface of the invention to the system controller computer of the invention for the print data stream portion of FIG. 3.
Figure 5:
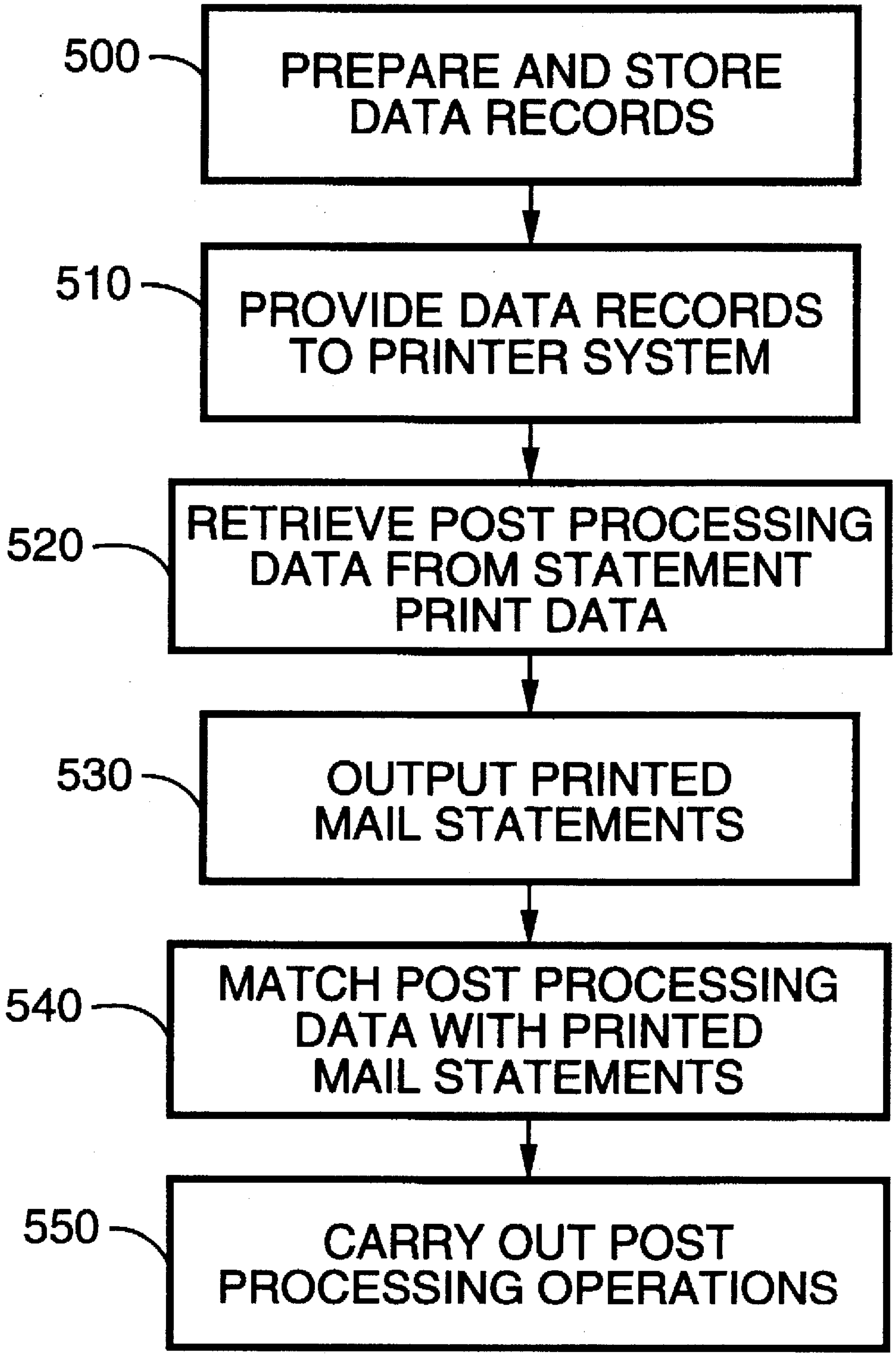
FIG. 5 is a flow chart showing generally the steps of the method comprising the present invention.

Referring more specifically to the drawings, for illustrative purposes the present invention is embodied in the mail assembly system which is generally shown and described in FIG. 1 through FIG. 4 and the method which is generally outlined in the flow chart shown in FIG. 5. It will be appreciated that the mail assembly system of the invention may vary as to configuration and as to details of parts or components, and that the method may vary as to the steps and their sequence without departing from the basic concepts as disclosed herein. The invention is disclosed, for illustrative purposes only, in terms of using a standard printer system capable of high volume, high speed output of printed mail statements. In the presently preferred embodiment, a XEROX 4635 printer system from the XEROX Company, Rochester, N.Y. is described with the invention for exemplary purposes, since the XEROX 4635 printer system is commonly used in the art. The use of the subject invention with a particular type of printer or printer system should not be considered limiting, however, as it should be readily apparent to those of ordinary skill in the art that the invention may also be employed with any type or variety of printer or printer system, including those available from XEROX, DELPHAX, SIEMENS, and others.

Figure 1:
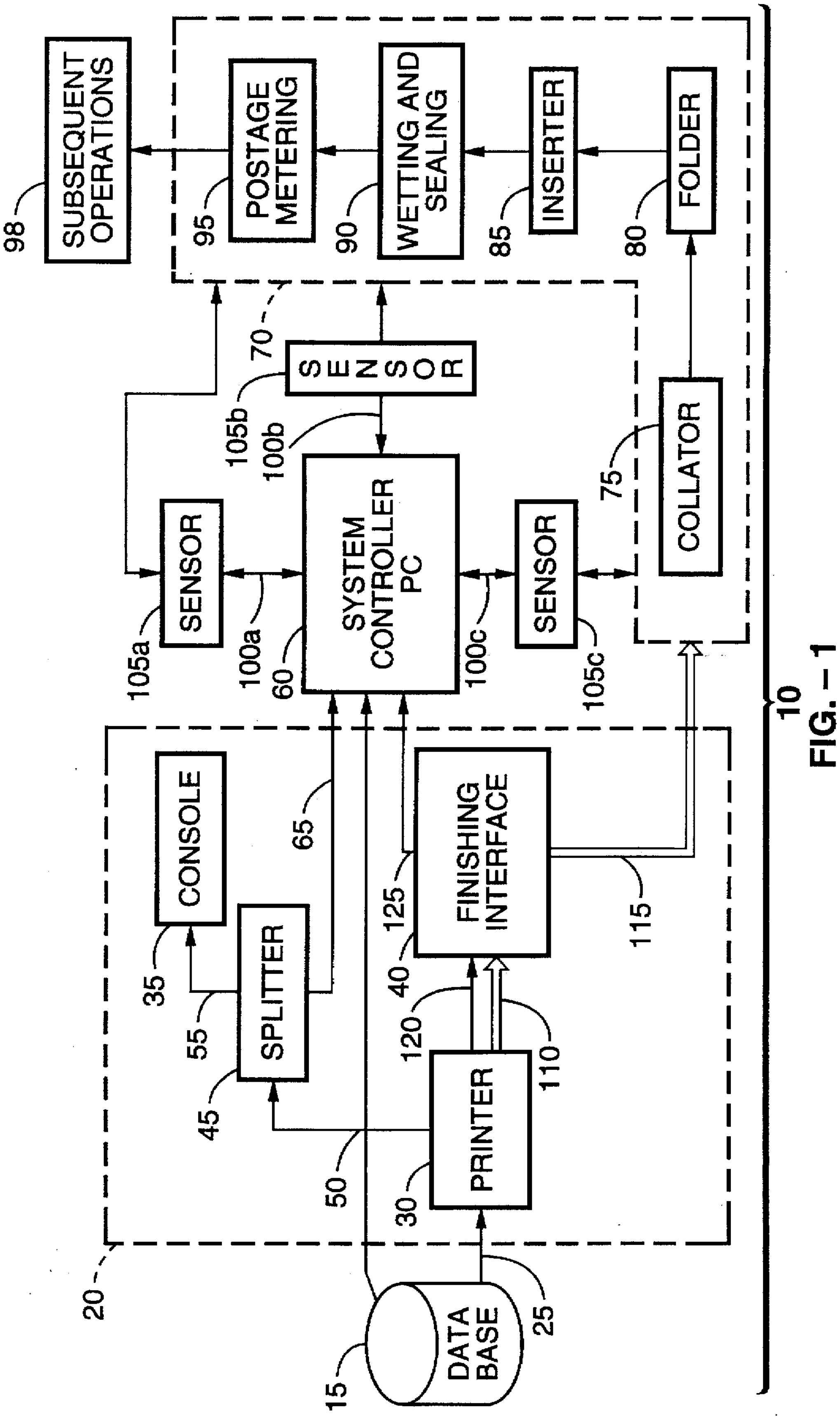
FIG. 1 is a functional block diagram showing generally the mail assembly system comprising the present invention.

Referring first to FIG. 1, a preferred arrangement of a mail assembly system 10 in accordance with the present invention is shown generally as a functional block diagram. The invention generally includes data storage means shown as data storage device 15, which may be in the form of magnetic or optical disc ROM, PROM, EPROM, EEPROM, or other like standard data storage means suitable for storing data required for the printing and processing of mailing pieces.

Stored in the data storage device 15 are data records for a plurality of mailing pieces which generally make up a large scale or bulk mailing job such as a periodic monthly billing operation or a mass-advertising operation wherein a large number of mailing pieces are prepared and mailed to a large number of recipients. As related above, each mailing piece generally comprises a billing statement, various types and quantities of inserts such as advertising materials, notices, flyers, coupons and like items, one or more return envelopes, and an outer mailing envelope for containing the aforementioned materials. Each billing statement comprises one or more printed pages or sheets of information such as itemized billing or individual customer account information. The billing statements generally have varying numbers of printed sheets since each statement will differ in the individualized billing or account information it contains.

The data records include statement print data for the plurality of mail or billing statements which are used for the printing of the statements. The statement print data is generally in the form of print image data for each sheet of each statement, and is generally organized or arranged within the data record in a sequential arrangement according to the order in which the sheets are to be printed. Thus, the data records are preferably organized such that a stream of statement print data comprising a sequence of printed sheet image data may be directed to printer means, as related below, for high speed, high volume output of printed mail statements.

The data records also includes post processing data for the plurality of mailing pieces. In the preparation of the mailing pieces, each printed mail or billing statement is generally processed or assembled into a finished mailing piece by various "post processing" operations which occur subsequent to the printing of the statements. Post processing operations, which are generally carried out under computer control, include for example, the separating, organizing, collating, and folding of the printed mail statements, inclusion of selected inserts with the mail statements, envelope insertion, envelope wetting and sealing, postage metering, mail bundle and mail tray placement and organization, zip code indexing and other operations. In order to carry out such post processing operations, the post processing data included with the stored data record may comprise, for example, information regarding the number of sheets or pages in each statement, the sequence number of each statement in the order to be processed, selective or dynamic insert enclosure information for each statement, mailing tray and mailing bundle location, zip code indexing information, and the like.

In the subject invention, the post processing data is embedded within the statement print data in non-printable character format or otherwise in a form which is not printed on or with the mail statements. The embedded non-print post processing data for the mailing pieces is preferably located at the beginning of the statement print data for each mail or billing statement. In other words, the post processing data for each mailing piece is located, positioned, or otherwise associated with the print image data for the first sheet of the corresponding mail or billing statement. The post processing data may alternatively be associated with the print image data for the last sheet of a statement, or otherwise generally located at the boundaries of the print data for each statement. The non-print post processing data is distinguished from the print image data by a code sequence which identifies and distinguishes the post processing data from the statement print data, which prevents the printer means from printing the post processing data, and which allows the post processing data to be retrieved from the print data stream as discussed below for use in directing post processing operations.

The subject invention includes printer means for outputting a plurality of printed mail statements according to the statement print data in the stored data records. The printer means preferably comprises a printer system 20 that is interfaced with the data storage device 15 via communication link 25 which provides for transfer of a stream of statement print data, together with the embedded post processing data, to printer system 20. Printer system 20 includes a printer device or high volume reprographics image output terminal (IOT) 30 which produces or generates printed or imaged sheets, an operator computer and console 35 for controlling the printer system 20, and a finishing interface or document finishing device (DFD) 40 discussed further below, which physically transfers or outputs printed sheets from printer system 20. The computer and console 35 internal to printer system 20 may be used to direct printing operations by printer system 20, or may be by-passed, with the computer means of the invention as discussed below used for direction of printing operations according to the statement print data.

The subject invention, when utilized with the XEROX 4135 or 4635 printer systems, may take advantage of a feature called "OTEXT", which is a command term from XEROX's job control language ("JCL"), for placing or embedding non-print post processing data within the print data stream. The OTEXT command is typically used to provide embedded, non-printed messages within a stream of print data which are directed to the operator computer console 35 for display. OTEXT messages are provided to indicate to a system operator that a print job requires the operators attention in some way such as, for example, the changing of bins or trays (not shown) in the printer system 20. The OTEXT messages are generally placed within the print data records at the time that the records are prepared or formulated. The OTEXT feature of the XEROX 4635 system thus provides a convenient, readily available format for including embedded non-print data, such as post processing data, within a print data stream for printing mail statements. The OTEXT command as provided by the XEROX 4635 and other XEROX printer systems, however, only provides for directing messages to the operator console 35 for display, and must be retrieved from the printer system 20 by the retrieval means of the invention, and matched with the printed statements by the matching means of the invention as discussed below, for use in post processing operations. The OTEXT messages, while sequentially displayed on computer console 35 according to their order within the print data stream, are not correlated in time with the printing of statement sheets or their transfer to post processing system 70 and thus cannot be used alone for matching printed statements with the appropriate post processing data. Neither OTEXT nor any other form of embedded, non-print data has heretofore been utilized for control of mail post processing operations, as disclosed herein. OTEXT is merely an example of a preferred manner of providing embedded non-printable post processing data in a print data stream when the invention is used with the XEROX 4635 printer system. Other coding arrangements or methods for including embedded, non-print post processing data within a print data stream are also considered to be within scope of the present the invention.

Means for retrieving, splitting, separating, recapturing, or otherwise recovering the embedded post processing data from the statement print data are provided with the invention. The retrieving means preferably comprise a "wedge" or splitter device 45 which is associated with printer system 20. The splitter device 45 is preferably a conventional Y -type splitter/recombiner which is positioned between printer device 30 and computer console 35 of printer system 20, and interfaced therebetween by communication links 50, 55 respectively. Splitter device 45 receives display data bound for printer console 35 (which includes OTEXT message data) from the data base 15 and printer device 30, and splits the data stream into two identical data streams, with one data stream directed to computer console 35 via link 55, and the other directed to the computer means as discussed below. The retrieving means of the invention may alternatively be positioned between printer device 30 and data storage 15 and may be internal or external to printer system 20, or may be located between printer device 30 and finishing interface 40. However, in the embodiment of the invention which utilizes a XEROX 4635 printer system and uses OTEXT for embedding post processing data within the print data stream, the retrieving means is preferably located between printer device 30 and computer console 35 as shown. Several locations for the retrieving means relative to printer system 20, both internal and external to printers system 20, are possible with the invention. The retrieving means also preferably comprises software and/or circuitry, associated with the computer means as discussed below, for distinguishing or discriminating the embedded non-print post processing data from the print data.

Computer means for system control are preferably provided with the subject invention, and preferably comprise a system controller computer 60 or a like device. System controller computer 60 is interfaced with splitter device 45 via communication link 65, and the data stream, including post processing data retrieved by splitter device 45, is directed via communication link 65 to system controller computer 60. System controller computer 60 includes software which identifies the post processing data within the data stream received from splitter device 45 and utilizes the post processing data for directing post processing operations, as related below in more detail. System controller computer 60 also directs printing of mail statements by printer system 20 according to the statement print data from the data stream provided by splitter device 45. System controller computer 60 generally includes conventional I/O means such as floppy disk drives (not shown) and conventional user interface means such as a keyboard and CRT or other display means (not shown). Note that when the invention is utilized with a XEROX 4635 printer system or like system which includes a computer 35 associated directly with the printer, the operator computer 35 is not utilized for control of printing operations, but instead the entire mail assembly operation, including printing of mail statements and the post processing thereof to form finished mailing pieces, is directed and controlled by system controller 60. The operator computer 35 is generally left in a "character mode" whereby OTEXT or other non-print messages may be displayed on the console.

Means for post processing a plurality of mailing pieces are preferably furnished with the invention in the form of a post processing system 70. Post processing system 70 generally includes one or more conventional mail post processing devices such as a collator 75 for collating the printed sheets of mail or billing statements transferred thereto from printer system 20, a buckle folder 80 for folding collated statements, an inserter apparatus 85 which includes a plurality of insert hoppers (not shown) for providing selective inserts to each statement, an envelope wetting and sealing apparatus 90 for sealing the stuffed envelopes, and a postage metering device 95. Additional devices for providing additional post processing operations may be included within post processing system 70. Alternatively, post processing system 70 may contain fewer devices and apparatus than are shown in FIG. 1.

Post processing system 70 is interfaced with system controller computer 60 by means of a plurality of communication links, shown generally as communication links 100*a–c*. Post processing operations by post processing system 70 are directed and controlled by system controller 60 by use of controlling software associated with system controller 60 and according to the retrieved post processing data received by system controller computer 60 from splitter device 45. Control instructions from system controller 60 are directed to post processing system 70 via communication links 100*a–c*.

A plurality of sensor or sensing means are preferably employed to monitor the post processing operations carried out by post processing system 70, and are shown generally as sensors 105*a–c*, positioned in association with communication links 100*a–c* respectively. The sensors 105*a–c* utilized with the invention preferably comprise conventional optical and electronic sensing means. For example, the position of each mail statement within post processing system 70 is generally tracked by encoder sensor means which provide for keeping track of the machine cycle of each device 75–95 within the post processing system 70, and thus the position or location of printed mail statements. The encoder means may comprise shaft encoders (not shown) located on a drive shaft or timing shaft (not shown) of each device 75–95, or an encoder located within the electric motors or other driving means (not shown) which drive the devices 75–79. The sensing means preferably also comprises a plurality of photocells (not shown) which track and monitor the movement and location of each printed mail statement as it moves through the devices 75–95 of post processing system 70. The aforementioned sensing means used in association with post processing of mail materials are standard and are well known to persons of ordinary skill in the art, and thus need not be described further in this disclosure. Note, however, that scanning means for detecting printed machine readable codes on mail statements are not included in the above sensing means, as such scanning means and printed codes are not required with the invention for control of post processing operations. Note also, however, that scanning means could be used in conjunction with the invention for form verification or other applications unrelated to post processing.

The post processing data for each mail statement received by system controller computer 60 from splitter device 45 may not temporally coincide exactly with the physical transfer of the corresponding printed mail statements from printer system 20 to post processing system 70, particularly in situations wherein a system shutdown has occurred due to a paper jam or other malfunction, which requires interruption of printer system 20 and post processing system 70 operation. Accordingly, the invention includes means for matching or correlating a plurality of printed mail statements exiting printer system 20 with the corresponding post processing data retrieved from the print data stream by the splitter device 45.

The matching means preferably includes means for identifying the boundaries of segments or sets of print data corresponding to individual mail or billing statements, and for informing or signaling system controller computer 60 when the last printed sheet of each printed mail or billing statement has exited, cleared, or otherwise been outputted from printer system 20, and that the next printed sheet to clear or exit printer system 20 will be the first printed sheet of a following or subsequent statement. Included in the print data stream, generally at the "boundaries" of the print data for each mail statement, is a first type of non-printable code sequence command which identifies or indicates that the preceding statement print data represents the printed sheet image for the last sheet in a mail or billing statement, and that the following statement print data represents the printed sheet image for the first sheet in a following statement. Preferably, the non-print command codes are included or associated with the beginning of the print data for each statement. For reasons of clarity, the code sequence command identifying the boundaries of the print data for each mail statement in the stream of print data is referred to hereinafter in this disclosure as the "SPLIT=NOW" code sequence command, which is a command code used with XEROX printer systems for designating the end of a segment or set of print data. Signals corresponding to the SPLIT=NOW command code indicate the boundaries of print data for the segments or sets of print data which make up the individual mail or billing statements. The SPLIT=NOW code sequence commands are utilized to inform or signal system controller computer 60 when the last printed sheet of each printed mail statement has exited printer system 20, as explained further below.

The matching means also preferably includes means for providing an odd-even numeric assignment to each mail or billing statement and for signaling or informing system controller computer 60 of the odd-even numeric assignment for each printed mail statement as it exits or clears printer system 20. An odd-even numeric assignment for each statement, which is indicated by a second type of non-printable code sequence command within the print data stream, is located generally at the boundaries between the segments or sets of print data representing each mail statement. This code sequence command, for reasons of clarity, will hereinafter be referred to as the switch function or "SF1" code sequence command. The SF1 FUNCTION=ON/OFF (or SF1 FUNCTION=YES/NO or SF1 FUNCTION=1/0) is a XEROX job control language command available in XEROX printer systems which may be used to signal or indicate to the finishing interface 40 to begin a specific operation. In the present invention, the SF1 command is a convenient and readily available way to provide the odd-even numeric assignment for each mail statement for use in matching the post processing data for each mailing piece with the corresponding printed mail statement, as discussed further below. As with the SPLIT=NOW command, SF1 commands are preferably associated with the beginning of the print data segment for each mail or billing statement. Signals corresponding to the SF1 commands are directed from printer system 20 to system controller 60, as discussed further below, for matching printed statements with post processing instructions. The matching means of the invention may alternatively use different command coding schemes for identifying the print data segments or sets for individual mail statements. For example, a numeric assignment scheme other than an odd/even or binary scheme may be utilized for providing identification to print data for each mail statement and for signaling the system controller according to such identification. However, a simple odd-even designation of mail statements as described further below is sufficient, and is presently preferred.

The means for signaling, informing or indicating to the computer means when the last printed sheet of each mail statement has cleared or exited the printer means, and whether or not each printed mail statement has an odd or even numeric assignment, preferably comprises the finishing interface device 40 associated with printer system 20 and its utilization of the code sequences commands SPLIT=NOW and SF1 described above. A finishing interface or document finishing system 40 for use with the invention is generally provided with the XEROX 4635 printer system related above. Finishing interface 40 receives the printed sheets outputted from printer device 30 by conventional mechanical transfer means along mechanical transfer route 110. Finishing interface 40 physically transfers, in sequential fashion, each printed sheet of each mail or billing statement from printer system 20 to the post processing system 70 via standard means along mechanical transfer route 115. Finishing interface 40 is also linked or interfaced to printer device 30 via communication link 120 whereby finishing interface 40 has access to the print data stream and the non-printable SPLIT=NOW and SF1 command codes placed therein. Finishing interface 40 is also interfaced with system controller computer 60 for providing signals thereto via communication link 125.

As each printed sheet is transferred from the finishing interface 40 to the post processing system 70 via route 75, finishing interface 40 provides or outputs a signal, hereinafter referred to as a "SHEET EXIT" signal, to system controller computer 60 via communication link 125, notifying the system controller computer 60 that a printed sheet has cleared printer system 20. The SHEET EXIT signal is preferably generated by physical detection of individual printed sheets as they leave the finishing interface 40 along path 115. The detection of the printed sheets as they exit finishing interface 40 may be carried out by standard electrical or optical sensing means (not shown).

Circuitry is included in the finishing interface 40 for identifying the non-printable SPLIT=NOW and SF1 FUNCTION command codes in the print data stream which identify the beginning and end of the print data segments corresponding to each mail statement, and which provide the odd-even numeric assignment for each mail statement. As printed sheets are physically received by finishing interface 40 from printer device 30 via route 110, and transferred from finishing interface 40 to post processing system 70 via route 115, the finishing interface 40 checks the print data stream received via communication link 120 for SPLIT=NOW and SF1 FUNCTION commands to determine if the printed sheet received and transferred is the last sheet of a mail or billing statement (and thus the next printed sheet to be received will be the first sheet of another mail statement), and to determine if the received printed sheet belongs to an odd-numbered or even numbered statement.

Upon detection of a SPLIT=NOW command, a signal is sent or outputted by finishing interface 40 to the system controller computer 60 via communication link 125 indicating that the end of a print data segment or set has been reached, and that the exiting printed sheet is the last sheet in a mail statement, and that the following sheet will be the first sheet of a subsequent statement. The signal sent by finishing interface 40 to system controller 60 upon receiving the SPLIT=NOW command is generally designated an END OF SET signal in the XEROX job control language, and for convenience will hereinafter be referred to as an END OF SET signal.

As each printed sheet exits finishing interface 40, the finishing interface 40 searches the print data stream received via link 120 for embedded SF1=ON and SF1=OFF commands. Generally, the invention uses an SF1=ON command in a print data segment to designate an odd numbered mail statement, and uses an SF1=OFF command to designate an even numbered mail statement, although this assignment is arbitrary and may be reversed. Upon detection of a SF1=ON command, an ON signal is sent or outputted by finishing interface 40 to the system controller computer 60 via communication link 125 indicating a print data segment for an odd-numbered mail statement has been detected, and that last sheet to exit finishing interface 40 belonged to an even-numbered mail statement, and that the following or subsequent sheet will be the first sheet of an odd-numbered statement. Likewise, upon detection of an SF1=OFF command in the print data, the finishing interface 40 sends an OFF signal to system controller 60 indicating that the last sheet to exit belongs to an odd-numbered statement, and that the subsequent sheet will be the first sheet of an even-numbered statement. The system controller computer 60 matches the parity of the SF1 FUNCTION signals associated with each printed statement exiting finishing interface with the parity of the post processing data received from splitter device 45, in order to match or correlate the post processing data with the appropriate printed statement. The END OF SET signals define the boundaries of the individual statements within the stream of printed sheets exiting finishing interface 40.

The matching means of the invention will be more fully understood by reference to FIG. 2 through FIG. 5, wherein the preferred arrangement of statement print data, embedded post processing data and non-printable commands indicating print segment boundaries and odd/even numeric assignment are illustrated, as well as the corresponding signal output sent by the finishing interface 40 to system controller computer 60.

Figure 2:
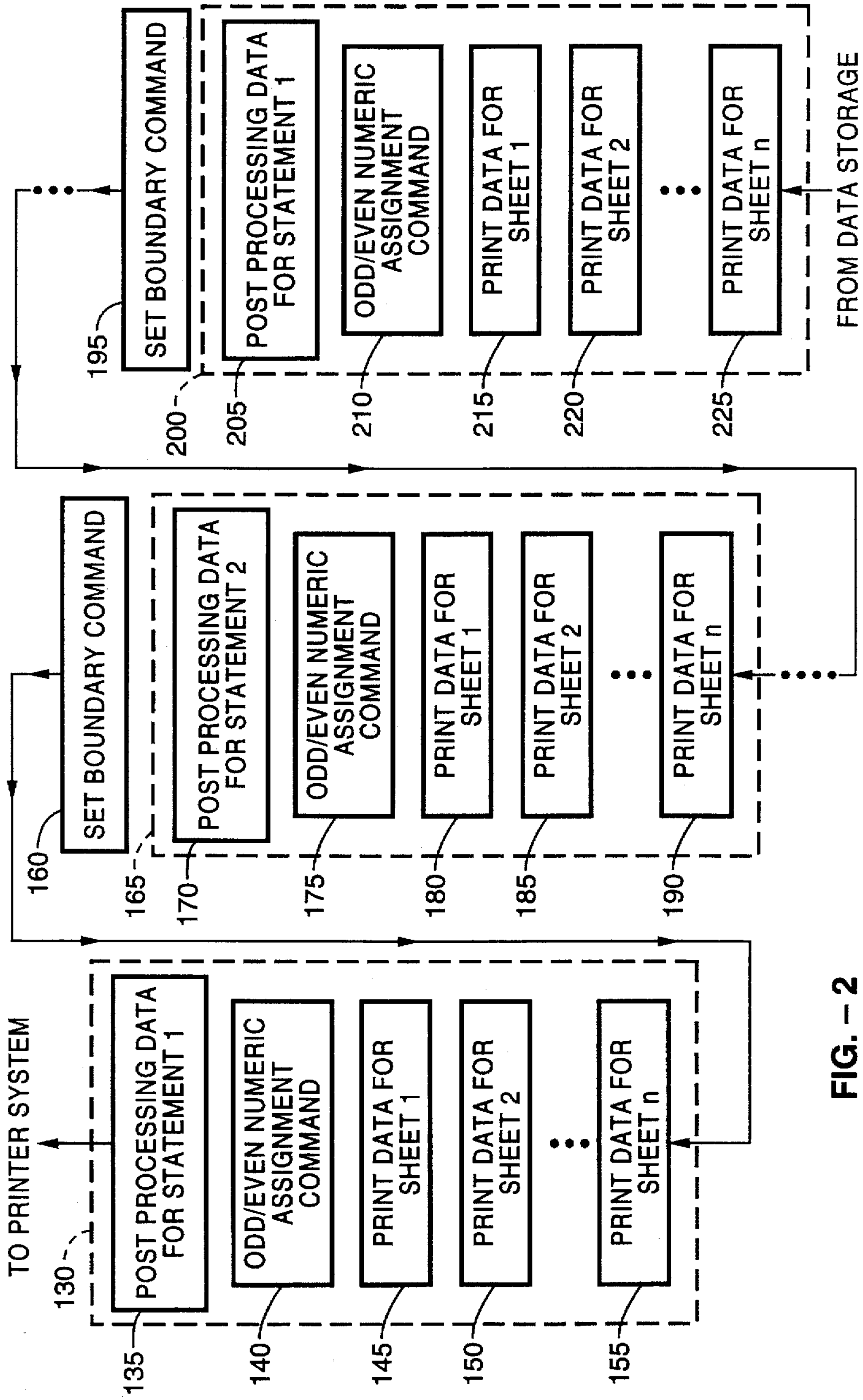
FIG. 2 is a diagrammatic representation of the presently preferred arrangement of statement print data and embedded non-printable post processing data in the stored data record of the invention.

Referring now to FIG. 2, as well as FIG. 1, there is shown a diagrammatic representation of a print data stream in accordance with the invention as it would be used by the mail assembly system 10 shown in FIG. 1. The print data stream shown in FIG. 2 is received by printer system 20 and printer device 30 from data storage device 15, by system controller 60 after retrieval by splitter device 45, and by finishing interface 40 as received from printer device 30 via link 120. Printed sheets corresponding to the print data shown in FIG. 2 are sequentially generated by printer device 30 and directed via finishing interface 40 to post processing system 70.

The data stream shown in FIG. 2 includes a first print data segment or set 130 corresponding to a first mail or billing statement to be printed. Data segment 130 includes post processing data for a first mail statement 135 in an embedded, non-print format as described above. Post processing data 135 includes instructions for post processing operations to be carried out on the first printed mail statement corresponding to data segment 130. Software and/or circuitry associated with system controller computer 60 identifies the embedded post processing data 135 according to an encoded alphanumeric sequence or sequences which distinguish the non-print post processing data 135 from print data generally.

Data segment 130 also includes a non-print numeric assignment command code 140 for providing an odd or even numeric assignment to data segment 130 and its corresponding printed mail statement. Finishing interface 40 includes circuitry for identifying numeric assignment command 140 so that a corresponding signal may be sent to system controller computer 60 indicating the odd or even numeric assignment of the printed first mail statement associated with print data segment 130.

Also included in data segment 130 are print data for the individual sheets of the first mail statement, shown as print data for a first sheet 145, print data for a second sheet 150, and print data for a final or nth sheet 155 (the number of sheets per statement will vary, as related above). Print data 145, 150, 155 generally comprises data representing the sheet images or the images of alphanumeric symbol arrangements as they will be reproduced on the printed first, second, and nth sheets respectively of the first mail statement. Print data 145, 150, 155 is used directly by printer device 30 for sequentially producing the first, second, and nth printed sheets of the first mail statement, which are subsequently transferred sequentially from printer device 30 to finishing interface 40 and hence to post processing system 70 as related above.

Adjacent first mail statement data segment 130 within the print data stream is a non-print set boundary command code 160 which indicates generally the end of print data segment or set 130 and the beginning of a following print data segment or set 165 for a second mail statement. Finishing interface 40 includes circuitry which identifies set boundary command 160 and sends a corresponding signal to system controller computer 60 indicating to system controller computer 60 the boundary between the first and last printed sheets of adjacent statements in the print stream, as described above. Set boundary command 160 is shown generally as independent from print data segment 130 and print data segment 165, although set boundary command 160 may included in or associated with the end of data segment 130 or the beginning of print data segment 165, if desired.

Print data segment 165 includes post processing data for a second mail statement 170, an odd-even numeric assignment command 175 for the second mail statement, and print data for first, second, and nth sheets 180, 185, 190 respectively of a second mail statement, which are used as described above in preparation of the printed second mail statement corresponding to print data segment 165. The print data stream generally includes an additional plurality of print data segments, which are not shown, corresponding to various individual mail or billing statements of the print job, each of which includes post processing data, a numerical assignment command, and which are separated from each other by a set boundary command, as shown above. At the end of the print data stream, a final or nth set boundary command 195 is followed by a last or nth print data segment 200, representing the final mail statement to be printed and processed. Data segment 200 includes post processing data 205 for the nth mail statement, a numeric assignment command 210 for the nth mail statement, and print data for the first, second and nth sheets 215, 220, 225 respectively of the nth or final mail statement. An additional non-print command (not shown) indicating the end of a print job may be included with the print data stream of FIG. 2 following data segment 200 for the nth or final mail statement. Such an end-of-job command would be used by finishing interface 40 to signal system controller computer that the last printed mail statement of a print job had exited the finishing interface 40 and been directed to post processing system 70, and that no further statements will be forthcoming.

Referring now more particularly to FIG. 3, as well as FIG. 1, there is shown a diagrammatic representation of a preferred print data stream configuration or format for use with a XEROX 4635 printer system or a like XEROX printer system, wherein non-printable command codes are shown using the XEROX job control language or JCL, and non-printable post processing data is shown in the form of OTEXT messages. The print data stream depicted in FIG. 3 includes print data for four mail statements having varying numbers of sheets or pages and varying post processing instructions. Note that when the invention is used with XEROX printer systems, the print data stream is preferably arranged such that all non-print commands and embedded non-print post processing data are located generally at the beginning of each data segment, and are followed by the corresponding print data, as shown in FIG. 3. However, the particular location or arrangement of non-print commands and post processing data within the print data stream may be varied as required for different applications of the invention.

In the print data stream of FIG. 3, a first print data set or segment 230 corresponding to a first mail statement includes a non-print OTEXT command or message 235 containing post processing data for the first mail statement. As mentioned above, OTEXT messages, which are utilized by the invention for embedding post processing data, are displayed on printer computer console 35 at generally the same time that the statement corresponding to the OTEXT message is being printed. The post processing data of OTEXT message 235, which, for reasons of clarity, is shown in simplified form as a text string in quotation marks, relates instructions that the first mail statement represented by data segment 230 includes only one printed sheet and that the second and third types of inserts, provided by inserter 85 of post processing system 70, are to be selectively included with the printed sheet of the first mail statement. The OTEXT message 235 is directed by printer device 30 to printer computer console 35, whereupon the OTEXT message 235 is displayed while the first mail statement is being printed according to print data segment 230. Splitter device 45 retrieves the OTEXT message 235 by splitting the print data stream as described above, and directing the print data stream, including OTEXT message 235, to system controller computer 60. Controlling software in system controller computer 60 identifies and uses the post processing data in the embedded OTEXT message 235 to direct post processing system 70 to carry out the above post processing instructions. Note that the text strings shown in quotation marks with OTEXT message 235, as well as with the other OTEXT messages in FIG. 3, are provided in a simplified form for illustrative purposes, and are not the actual text strings as they would appear on console 35 of printer system 20.

Print data set or segment 230 also includes a non-print SF1 FUNCTION=ON command 240 which, as related above, turns the SF1 finisher function on, and is used with the invention to provide a numeric assignment to the first mail statement represented by print data segment 30, and indicates that the first mail statement corresponding to print data segment 230 is an odd-numbered statement. The SF1 FUNCTION=ON command is utilized by finishing interface 40 for signaling system controller computer 60, as mentioned above and discussed below in more detail, that the first mail statement is an odd numbered statement.

Print data segment 230 additionally includes print data 245 comprising the image data for the single sheet of the first statement represented by data segment 230. Print data 245 is utilized by printer 30 for generation of the physical printed sheets.

Adjacent to and following or upstream from print data segment 230 is a print data set or segment 250 for a second mail statement. Adjacent the beginning or downstream edge of data segment 250, and adjacent the end or upstream edge of print data segment 230 is a non-print SPLIT=NOW 253 command indicating generally a boundary between the end of data segment 230 for the first mail statement and the beginning of data segment 250 for the second mail statement. As related above and discussed in more detail below, the SPLIT=NOW command is used by finishing interface 40 for signaling system controller 60 when the last printed sheet of the first mail statement represented by data segment 230 has exited or cleared finishing interface 40 and printer system. Data segment 250 includes an embedded, non print OTEXT message 255 for the second mail statement, which has post processing data shown as a simplified text string in quotation marks stating that the second statement consists of three printed sheets, and that the second insert (from inserter 85) is to be selectively included with the second mail statement represented by data segment 250. An SF1 FUNCTION=OFF command 260 is included in data segment 250 to indicate that the second mail statement is an even numbered statement. Print data or sheet image data for first, second and third sheets 265, 270, 275 respectively of the second mail statement are provided with data segment 250 which used for generating the corresponding printed sheets by printer device 30.

Adjacent to and immediately upstream from or following print data segment 250 is a print data segment 280 for a third mail statement. A SPLIT=NOW command 285 interposed between the beginning or leading edge of data segment 280 and the trailing edge of data segment 250 defines the boundary between data segments 250 and 280. An OTEXT message 290 provides post processing data for the third mail statement which, as shown by the text string of OTEXT message 290, indicates that the third mail statement includes two printed sheets and that insert number three is to be selectively included with the third mail statement. An SF1 FUNCTION=ON command 295 indicates that the third mail statement is an odd numbered statement, and print data 300, 305 for the first and second sheets of the third mail statement are provided.

Following data segment 280 within the print data stream is print data segment 310 for a fourth mail statement, with a boundary-defining SPLIT=NOW command 315 located at the beginning of data segment 310. The OTEXT message 320 for the fourth mail statement includes post processing data with information showing that there are two printed sheets in the fourth statement, and that the first, second and third inserts are to be added to the statement by inserter 85. An SF1 FUNCTION=OFF 325 command indicates that print data segment 310 represents an even numbered statement, and print data 330, 335 include image data for the first and second printed sheets of the fourth statement. Additional print data segments or sets (not shown) may follow print data segment 310, to represent additional printed statements which may be prepared. The number of print data segments will necessarily vary for different sized mail preparation jobs.

Referring now to FIG. 4, as well as FIG. 1 and FIG. 3, there is shown generally, in graphic representation of square voltage versus time functions, the signals sent to system controller computer 60 by finishing interface 40 via communication interface 125 according to the print data stream of FIG. 3. Note that communication interface 125 preferably comprises a cable which generally has a plurality of wires, with individual wires from the plurality of wires available for transmission of the different types of signals shown in FIG. 4. As described above, printer device 30 sequentially generates or produces printed sheets corresponding to the sheet image data in FIG. 3 and in the sequential order generally shown in FIG. 3. The printed sheets are sequentially transferred in the same order from printer device 30 to finishing interface 40 along mechanical transfer route 110 and hence to post processing system 70 along mechanical transfer route 115, as related above. The embedded post processing data depicted in the OTEXT messages of FIG. 3 is retrieved from the data stream by splitter device 45 and relayed to system controller computer 60 via communication link 65, as described above. The OTEXT messages are received sequentially by system controller computer 60 in the order provided in the print data stream. However, the actual generation and transfer of printed sheets generally requires more time than the transfer of the OTEXT messages, and the timing of the receipt of OTEXT messages by system controller computer 60 from splitter device 45 generally does not automatically correlate with or match the timing of the physical transfer, from finishing interface 40, of the printed statements corresponding to the OTEXT messages. Thus, the matching means of the invention are required.

Finishing interface 40 provides a SHEET EXIT signal to system controller computer 60 via communication interface 125, as each printed sheet physically clears or exits finishing interface 40 en route to post processing system 70. Horizontal line 340 in FIG. 4 represents a series of SHEET EXIT signals as square voltage waves for printed sheets corresponding to the sheet image data shown in FIG. 3, which are sent to system controller computer 60 by finishing interface 40. The SHEET EXIT signal is generally active during the time that any sheet is exiting the finishing interface 40.

When the last printed sheet exiting finishing interface 40 corresponds to the print data for the sheet prior to a SPLIT=NOW command, an END OF SET signal is directed from finishing interface 40 to system controller computer 60 via communication interface 125. The END OF SET signal goes active while the last sheet of each statement is exiting finishing interface 40. Horizontal line 345 represents a series of END OF SET signals as square voltage waves corresponding to the SPLIT=NOW commands shown in FIG. 3.

The SF1 FUNCTION ON or OFF signal sent by finishing interface 40 to system controller 60 via communication interface 125 according to the SF1 FUNCTION commands shown in FIG. 3 are represented by the square voltage waves of horizontal line 350. The SF1 FUNCTION signal changes occur, according to the SF1 command associated with the statement, as the first sheet of each statement exits the finishing interface. The SF1 signals provided by finishing interface 40 are merely on/off voltage signals, with SF1 arbitrarily set as equal to zero or "OFF" for odd numbered mail statements, and SF1 "ON" or equal to one for even numbered mail statements.

The SHEET EXIT signal for the first printed sheet of the first statement generated from print data segment 230 in FIG. 3 is shown by square wave 355 on line 340. The SHEET EXIT SIGNAL 355 corresponds to the print data 245 for the first sheet in FIG. 3, and is active when the sheet corresponding to print data 245 is exiting finishing interface 40 as related above. Since there is only one printed sheet in the first mail statement as indicated by OTEXT message 235 and the following SPLIT=NOW command 255, an END OF SET square wave signal 360 on line 345 is also generated as the first printed sheet of the first statement exits finishing interface 40. Additionally, since print data segment 230 includes an SF1 FUNCTION command 240 indicating that the first statement is an odd numbered statement, an SF1 FUNCTION=ON signal, shown as wave shoulder 365 on line 350, goes active as the first sheet of the statement exits finishing interface 40. A dashed line 370 is provided to show generally the boundary between the first and second mail or billing statements as defined by the finishing interface signal output of FIG. 4.

The next printed sheet to exit finishing interface 40, according to the print data stream of FIG. 3, is the first sheet of a second mail statement corresponding to print data segment 250. A sheet exit signal 375 corresponding to the first printed sheet of the second mail statement is shown on line 340 of FIG. 4. As related by OTEXT message 255, the second mail statement includes three printed sheets corresponding to print data 265, 270, 275 in data segment 250. Square waves 380, 385 on line 340 of FIG. 4 indicate the SHEET EXIT signals for the second and third printed sheets respectively of the second mail statement. According to the SF1 FUNCTION command 260, an OFF signal, shown as wave shoulder 390, goes active at generally the same time as SHEET EXIT signal 375 is activated for the first sheet of the second statement. Since the third printed sheet of the second statement, indicated by SHEET EXIT signal 385, is the last sheet of the second statement according to the SPLIT=NOW command 285, an END OF SET signal, shown as square wave 395, goes active while the third sheet of the second statement exits finishing interface 40. Note that no END OF SET signals are associated with the first and second SHEET EXIT signals 375, 380, since these signals are not associated with the last sheet of a statement and the corresponding print data 265, 270 for these sheets are not adjacent to a SPLIT=NOW command in the print data stream of FIG. 3. Note also that no SF1 FUNCTION signal accompanies SHEET EXIT signals 380, 385, as an SF1 FUNCTION command is associated only with the first sheet of the second statement represented by print data 265, and not the second or third sheets corresponding to print data 270, 275. A dashed line 400 shows generally the boundary of the second and third mail statements according to the signal output scheme of FIG. 4.

Square waves 410 and 415 indicate the SHEET EXIT signals for the first and second printed sheets respectively of the third mail statement corresponding to print data 300, 305 in data segment 280 of FIG. 3. According to SF1 FUNCTION command 295, an ON signal, shown as wave shoulder 420, goes active when SHEET EXIT signal 410 is activated to indicate an odd-numbered statement. Since the third statement includes two sheets, as indicated by OTEXT message 290 and SPLIT=NOW command 315, an END OF SET signal, shown as square wave 425, goes active with SHEET EXIT signal 415 for the second and last printed sheet of the third statement to exit finishing interface 40. Dashed line 430 represents generally the boundary between the third and fourth mail statements as shown by the finishing interface output signals of FIG. 4. Square waves 435 and 440 indicate signals corresponding to the first and second printed sheets of the fourth statement, shown as print data 330, 335 in data segment 310 of FIG. 3. Wave shoulder 445 is an SF1=OFF signal indicating an even-numbered statement, and square wave 450 is an END OF SET signal for the fourth mail statement, and is active at the same time as SHEET EXIT signal 440 for the final sheet of the fourth statement. Additional signals (not shown), corresponding to additional following mail or billing statements, may also be associated with the signal output depicted generally in FIG. 4.

The finishing interface 40 thus provides system controller computer 60 with a plurality of signals, as described above, associated with the exiting of printed sheets from the finishing interface 40, which allows system controller computer 60 to match the parity of the post processing data received from splitter device 45 with the parity of the printed mail statements directed from finishing interface 40 and printing system 20 to post processing system 70.

In order to include the correct types of inserts and generally perform the correct post processing operations on each statement exiting finishing interface 40, the system controller computer 60 must identify which post processing data, in the form of OTEXT messages, are associated with each statement, and correctly match or correlate the post processing data with the corresponding statements. By monitoring the SHEET EXIT and END OF SET SIGNALS provided by finishing interface 40, system controller computer 60 can identify each printed sheet and separate mail statement as it is sequentially transferred from finishing interface 40 to post processing system 30. Each time a SHEET EXIT signal is accompanied by an END OF SET signal, the system controller computer 60 is informed of that the last sheet of a statement is exiting the finishing interface 40. The post processing data contained in the OTEXT messages are sequentially provided to system controller computer 60 by splitter device 45 in the same sequential order as mail statements exit finishing interface 40, system controller computer can match the corresponding post processing data with each printed mail statement exiting finishing interface.

At first glance, it appears as though the SF1 FUNCTION commands and corresponding signals are not necessary for matching or correlating post processing data with corresponding printed mail or billing statements, since the same sequential arrangement of OTEXT messages and printed statements are produced. Unfortunately, however, the sequential delivery of post processing data-containing OTEXT messages to system controller 60 does not occur at the same time as the sequential transfer of printed statements from finishing interface 40, as mentioned above. Thus, the post processing data being received by system controller 60 at a given time generally will not correspond to the printed sheets of the statement being transferred from finishing interface 40 to post processing system 70 at that same point in time. Additionally, mail preparation operations are frequently interrupted due to paper jams, data errors, power surges, and other causes, such that printing is interrupted in the middle of a statement. Thus, upon re-starting the operation, the first sheet to exit finishing interface is not necessarily the first sheet of a statement. As shown in FIG. 3, the OTEXT messages are associated with the beginning of each print data segment. When mail assembly system 10 has been interrupted in the middle of an operation, followed by the resumption of operation at a point other than the first sheet of a statement, the OTEXT message associated with the interrupted statement is not displayed on printer computer console 35, and no post processing data is communicated to system controller computer 60 for the remaining sheets of the statement as the sheets exit finishing interface 40.

The odd/even numeric assignment of each billing statement by SF1 FUNCTION commands as provided by the matching means of the invention allows for parity matching of post processing data with corresponding statements in the event of a system shutdown, and overcomes problems associated with the timing difference between the OTEXT message delivery by splitter 45 to system controller computer 60 and the output of the corresponding printed statements from finishing interface 40. The advantage provided by use of an odd-even numeric assignment of printed statements will be more readily understood by reference to FIG. 5, as well as FIG. 1, FIG. 3, and FIG. 4.

Shown in FIG. 5 is a portion of the SHEET EXIT and END OF SET signals of FIG. 3, without the corresponding SF1 FUNCTION signals. Two examples of a system shut down of mail assembly system 10 are illustrated in FIG. 5, as indicated by arrows A and B in FIG. 3, FIG. 4, and FIG. 5. In the first example, indicated at arrow A, a system shutdown occurs after exit of the first sheet of the second statement from finishing interface 40 and prior to the exit of the second sheet of the second statement from finishing interface 40. Upon re-starting at the point indicated by arrow A in FIG. 4, the first printed sheet to leave finishing interface will be the second sheet of the second statement, and a SHEET EXIT signal 380 is accordingly provided by finishing interface 40 to system controller computer 60, as described above. System controller computer 60 receives no OTEXT message in association with the printed sheet corresponding to SHEET EXIT signal 380, since the OTEXT message is located within the print data stream (FIG. 3) at a point prior to the system shutdown at arrow A. The next sheet to exit finishing interface, which is the third and final sheet of the second statement, has an END OF SET signal 395 accompanying the SHEET EXIT signal 385, and again has no associated OTEXT message. The first post processing data received by system controller computer 60 following a shutdown at arrow A is OTEXT message 290 (FIG. 3) for the third billing statement, since OTEXT message 255 for the second statement was received prior to the shutdown.

In the second example, a system shutdown and startup occurs generally at the point indicated by arrow B, such that the first printed sheet to exit finishing interface 40 upon re-starting the system is the first sheet of the third statement, indicated by SHEET EXIT signal 410. The second and final sheet of the third statement generates a SHEET EXIT signal 415 upon exiting finishing interface 40, together with an END OF SET signal 425. The post processing data associated with the printed sheets of the third statement is OTEXT message 290, which is the same post processing data associated with the last two sheets of the second statement in the first example above.

Thus, in both the first and second examples, system controller computer 60 receives a SHEET EXIT signal for a first sheet, a SHEET EXIT signal and accompanying END OF SET signal for a second sheet, as seen most clearly in FIG. 4. The post processing data associated with the first printed sheets in each example is OTEXT message 290. The system controller computer 60 cannot distinguish between these two situations, and the wrong post processing operations are carried out on the printed statements, resulting in incomplete and incorrectly assembled mailing pieces.

To avoid the problem illustrated by the above examples, the matching means of the invention preferably includes an odd even numeric assignment, such as that provided by the SF1 FUNCTION command, to avoid the matching problem described above. Referring again to FIG. 3, the SF1 FUNCTION signal is OFF in the first example indicated at arrow A, and the SF1 FUNCTION signal is ON in the second example indicated at arrow B. By comparing the statement number in the post processing text of the OTEXT message 290 with the status of the SF1 FUNCTION, system controller computer 60 can distinguish the two examples provided above. In other words, system controller computer 60 performs a parity match between the ON and OFF signals generated from the SF1 FUNCTION commands, and the number of each statement as provided in the post processing data of the OTEXT message. If there is no parity match, as in the case of a shutdown at the point indicated by arrow A, system controller computer 60 can locate the preceding OTEXT message 255 from its memory for use with the second and third sheets of the second statement, or initiate a system shutdown and notify an operator that there is a data error, or take other appropriate corrective measures.

The matching means of the invention preferably includes programming, associated with system controller 60, for determining, correlating, or matching the parity of the post processing data received from splitter device 45 with the parity of the printed mail statements provided to post processing system 70. The programming, which utilizes the SHEET EXIT, END OF SET and SF1 FUNCTION signals sent from finishing interface 40 to system controller computer as well as the post processing data sent from splitter device 45 to system controller computer 60, preferably carries out the operations of:

i) identifying or verifying the exit of each printed sheet from finishing interface 40 and printer system 20;

ii) identifying or verifying the exit of the last printed sheet of each mail statement from finishing interface 40 and printer system 20;

iii) identifying or verifying the odd-even numeric assignment of each printed statement to leave finishing interface 40 and printer system 20;

iv) identifying post processing data received from splitter device 45 by system controller computer 60;

v) matching the parity of the post processing data from splitter device 45 with the printed mail statement exiting finishing interface 40 and printer system 20; and vi) repeating the above programming steps each time a printed sheet exits finishing interface 40 and printer system 20.

Referring again to FIG. 3 and 4, as well as FIG. 1, a system shutdown which interrupts printing and transfer of printed sheets at the point indicated by arrow A presents another problem related to incomplete or partial mail or billing statements. Even with the matching means as described above, a system shutdown at the point indicated by arrow A may result in an incomplete second statement which is matched with the correct post processing data. While the odd/even numeric assignment of statements allows parity matching of the statements and corresponding post processing data, upon start up at a point other than a print segment boundary such that lo the first sheet to exit finishing interface 40 is the first sheet of a statement, the correct post processing data will may be matched to an incomplete statement. Thus, in addition to synchronizing or matching the statements exiting finishing interface 40 with the corresponding OTEXT messages, the matching means of the invention also preferably includes means for verifying the receipt of the complete printed statements by the post processing system 70.

The verification means of the invention preferably comprises means for signaling or indicating to finishing interface 40 by system controller computer 60 to acknowledge that each sheet of each statement (or each completed statement) has been received by post processing system 70, and means for stopping printer system 20 if the acknowledgment signal for a completed statement is not received by system controller computer 60 after a set period of time. Referring again to FIG. 1, as well as FIG. 3 and FIG. 4, a plurality of sensors **105*a*–105*c* are associated with post processing system 70 and interfaced with system controller computer 60 via communication links 100*a*–100*c* respectively. As mentioned above, the sensors 105*a–c* comprise in part photocell arrangements associated with collator 75, folder 80, inserter 85, wetting and sealing apparatus 90, postage metering device 95, as well as other devices (not shown) which may be included in post processing system 70. The sensors 105*a–c* also generally include encoder means, as mentioned above, which allow monitoring of the matching cycle of collator 75, folder 80, inserter 85, wetting and sealing apparatus 90, postage metering device 95, or any other devices included in post processing system 70. The location of the sensors 105*a–c* within post processing system 70 may be varied as required. Sensors 105*a–c* physically detect the presence and location generally of each printed sheet of each statement at various points along post processing system 70, and verify the presence of each sheet to system controller computer 60 by an acknowledgment signal via communication links 100*a–c***.

The post processing data provided to system controller 60 by the OTEXT messages indicate the number of printed sheets in each statement, and the SHEET EXIT signals and END OF SET signals from finishing interface 40 inform system controller computer 60 of the time that each printed sheet and each completed statement exits finishing interface 40 and enters post processing system 70. Thus, system controller computer 60 is informed of the number of printed sheets in each statement entering the post processing system, and the time at which each sheet enters post processing system 70. Since the machine cycle timing of the post processing devices and distances traveled by the printed sheets within post processing system 70 are known, system controller computer 60 also knows generally the time or timing at which each printed sheet should arrive at various points in the post processing system 70 which are monitored by sensors **105*a–c*. Upon detection by sensors 105*a–c* of the correct number of sheets within the correct time period for each statement at one or more points within post processing system 70, system controller computer 60 sends an acknowledgment signal or signals via communication link 125 to printer system 20 and finishing interface 40, verifying receipt of a complete printed statement. If sensors 105*a–c* fail to detect the presence of an expected statement sheet or complete statement within a certain time period, no acknowledgment signal is sent by system controller computer 60 to finishing interface 40. Internal timing means (not shown), such as an oscillating quartz crystal device, are included with printer computer 35 or elsewhere in printer system 20, as is common in the art, which allows printer system 20 to track the time period between acknowledgment signals from system controller computer 60**.

If no acknowledgment signal is received from system controller computer 60 within a set period of time, printer system 20 shuts down or interrupts output. The first sheet to exit finishing interface 40 upon re-starting printer system 20 will be the first sheet of the first statement not acknowledged. Preferably, upon shutdown of printer system 20, system controller computer 60 determines and locates the point in the print data stream corresponding to the beginning of the print data for the interrupted statement, and marks this point as the start up point for printing when printer system is re-started. Thus, not only does the verification means provide for re-starting printer system at a print segment boundary, but provides for recovery of a statement which is incomplete or otherwise not properly received by post processing system 70 due to the error which caused the system shutdown.

During such a system shutdown, an operator generally inspects post processing system 70 and mail preparation system 10 generally to find and correct the error, such as a paper jam, which prevented the acknowledgment signal from being sent by system controller computer 60. The operator preferably removes the printed sheets of the statement or portions thereof which are involved in the error, to clear any jams. Upon restarting printing by printer system 20, printing is resumed at the point in the print data stream corresponding to the beginning of the print data for the statement involved in the error, and the statement which was damaged and removed during the shutdown is recovered. By this verification means, the generation of partial or incomplete statements due to shut-down and restarting, as in the above example resulting from a system shutdown at the point indicated by arrow A, is avoided.

The verification means used with the matching means of the invention is generally available in the XEROX 4635 system, and is referred to generally as segment recovery, wherein printing is interrupted and restarted at a point corresponding to the beginning of the print data segment for the statement which is the most advanced in position along the mechanical transfer route or path 115 in printer system 20. By re-starting printing at the beginning of the print data segment corresponding to the statement which has not yet had all sheets transferred from finishing interface 40, the complete statement is recovered after a system shut down. The partial statement, which is incomplete due to the error which caused interruption of the system, is removed by an operator during the shutdown. The acknowledgment signal provided by system controller 60 to printer system 20 via communication link 125 is called, in XEROX terminology, the SET RECOVERED signal.

Generally, the verification or segment recovery means of the matching means, wherein the re-starting of printer system 20 after a shut down such that incomplete statements are not produced, includes programming, associated with system controller 60, for monitoring sensors 105*a–c*, for sending acknowledgment signals to printer system 20 at the proper times, and for locating or determining the point in the print data stream at which to resume printing, following an interruption, which corresponds generally to the beginning of the print data for the statement involved in the error which resulted in the shutdown. The programming utilizes the SHEET EXIT, END OF SET and SF1 FUNCTION signals sent from finishing interface 40 to system controller computer 60, internal timing means associated with system controller computer 60, together with the feedback from sensors 105*a–c* to system controller computer 60. Preferably, the programming included with the verification means carries out the operations of:

i) monitoring sensors 105*a–c* to detect receipt of printed sheets by post processing system 70 from finishing interface 40.

ii) sending an acknowledgment signal to printer system 20, after receipt of an END OF SET signal from finishing interface 40 and upon detection by sensors 105*a–c* of the last printed sheet of the statement corresponding to the received END OF SET signal;

iii) mark time, and if an acknowledgment signal is not sent to printer system 20 after a set period of time, interrupt printing by printer system 20 and locate and mark the point in the print data stream corresponding to the beginning of the statement which is in the most advanced position along mechanical transfer route 115; and iv) repeating the above steps for each END OF SET signal received from finishing interface 40.

In the event that the acknowledgment signal is not received and the printing operation is halted, an operator clears or removes the sheets of the statement from post processing system 70 and transfer route 115 that caused the error which prevented the acknowledgment signal from being sent to printer system. Then, upon re-starting the system, the above programming operations are repeated by system controller computer 60.

Since printer system 20 generally operates under the direction and control of system controller computer 60, the verification means may, in embodiments of the invention which do not use a XEROX 4635 printer system, omit the acknowledgment signal sent from system controller computer 60 to printer system. In such a case, after receiving a signal from printer system 20 verifying the transfer of a statement from printer system 20 to post processing system 70 and upon receiving sensor feedback indicating an error in receipt of the printed statement by the post processing system 70, system controller computer 60 could interrupt printing and locate the appropriate startup point without the aforementioned acknowledgment signal. However, in the preferred embodiment of the invention when utilizing a XEROX 4635 printer system, the verification means preferably utilizes the SET RECOVERED signal available with the XEROX 4635 as an acknowledgment signal in the manner described above.

In utilizing the verification or segment recovery means as described above, printer system 20, upon re-starting after a shutdown due to a paper jam or other reason, will always be positioned to resume printing at a segment boundary, so that when mail assembly system 10 is re-started the first printed sheet to exit finishing interface 40 upon re-starting will be the first printed sheet of a statement, thereby avoiding the production of incomplete mail or billing statements.

Preferably, the verification means of the matching involves monitoring of sensors associated with collator 75 in post processing system 70, and the acknowledgment signal is sent by system controller 60 to printer system upon verification by sensors 105*a* of the receipt of all sheets of a statement and the successful launching or delivering of the completed statement from collator 75 to folder 80. Sensors 105*a*, for example, may comprise photocell sensors positioned adjacent a collating tray (not shown) in collator 75, with the sensors monitoring the receipt by the collating tray of each printed sheet transferred from finishing interface 40, and the ejection or launching of collated sheets from the tray towards folder device 80. If there is an error in the receipt of any sheet of a statement (as indicated by the SHEET EXIT and END OF SET signals), or in the launching of the collated statement from the tray, no acknowledgment signal will be sent by system controller 60, and printer system is interrupted at the appropriate print data segment boundary so that an operator may check for and correct paper jams or other errors in the collator tray, as well as in post processing system 70 and along mechanical transfer route 115.

The verification means of the matching means may alternatively utilize sensor monitoring of other or additional portions of post processing system. For example, instead of associating acknowledgment signals with the successful transfer of completed statements from collator 75 to folder 80, monitoring of the output of folded statements from folder 80 may be utilized for generation of acknowledgment signals as described above.

Thus, with the matching means of the invention as described above, the correct post processing data is matched or correlated with each printed mail statement produced by printer system 20 and transferred to post processing system 70 by finishing interface 40. If the mail assembly system 10 undergoes a shutdown due to a paper jam or other error, re-starting of the system occurs at a segment boundary corresponding to the beginning of the interrupted statement, so that incomplete statements are not produced.

Referring now to FIG. 5 as well as FIG. 1 through FIG. 4, the method of using the mail assembly system is generally shown. At step 500, data records for a plurality of mailing pieces is formed and stored. Generally, the data records will conform to the requirements of a mailing customer who must send out a large number of periodic billing or accounting statements, or a large number of advertising materials. Mailing job planners generally organize the contents of the data records according to the requirements of the mailing customers. The data records are stored on conventional data storage means, as related above.

The data records formed and stored in step 500 generally includes statement print data for a plurality of mail statements, which is used to print a plurality of mail statements in a subsequent step. The statement print data is preferably in the form of print image data for each sheet of each mail statement, and is organized within the data record in a sequential arrangement according to the order in which the sheets are to be printed. The data records also include post processing data for a plurality of mailing pieces. As related above, the post processing data in the stored data records generally includes information regarding the number of pages in each mail statement, the sequence number of each statement in the order to be processed, selective insert enclosure information for each statement, mailing tray and mailing bundle location, zip code indexing information, and the like. The post processing data, which may be in the form of an OTEXT message, is preferably embedded within the statement print data in non-printable character format at the beginning of print data segment for each statement as provided above, and is distinguished from the statement print data by a code sequence which allows retrieval of the post processing data in a subsequent step.

At step 510, the statement print data and embedded post processing data from the data records formed in step 500 are provided or directed to printer means for printing a plurality of mail statements. The printer means preferably comprises a printer system 20 such as a XEROX 4635 or other printer system capable of high speed, high volume output of a plurality of printed mail statements. The statement print data and embedded post processing data from the data record are directed to printer system 20 via conventional communication link 25 which provides for transfer of a stream of statement print data, together with the embedded post processing data, to printer system 20. As related above, printer system 20 preferably includes a printer device or IOT 30 for generating printed or imaged sheets, an operator computer and console 35, and a finishing interface 40. The XEROX 4635 printer system allows use of the OTEXT feature, described above, which facilitates the formation of the data record in step 500 by providing a readily available format for inclusion of non-print post processing data within a stream of print data.

At step 520, the embedded post processing data from the data record formed in step 500 is retrieved or recovered from the stream of print data directed to the printer means in step 510. Step 520 is generally carried out by retrieving means, which preferably comprise a "wedge" or splitter device 45, as related above, which is associated with printer system 20. The splitter device 45 splits the print data stream and directs a copy of the data stream to system control computer 60. System control computer 60 includes software for identifying the code sequence distinguishing the embedded post processing data from the surrounding print data, and allows retrieval of the post processing data from the statement print data. Retrieved post processing data is directed from splitter device 45 to system controller computer 60, for use in a subsequent post processing step.

At step 530, a plurality of mail statements are printed, generated, or outputted by the printing means of the invention, according to the statement print data in the data records formed in step 500 and directed to the printer means in step 510. This step is generally carried out by conventional imaging or printing means associated with printer device 30 and printer system 20. The printing of step 530 is preferably carried out sequentially generating printed sheets according to statement print data in the print data stream. Printing step 530 is generally carried out under the direction and control of system controller computer 60.

At step 540, the post processing data retrieved in step 520 is matched with the corresponding printed mail statements obtained in step 530. The matching step 540 is preferably carried out by utilizing means for informing or signaling system controller computer 60 when the last printed sheet of each printed mail statement has exited the printer means, and means for providing an odd-even numeric assignment to each printed mail statement and for signaling or informing the computer means of the odd-even numeric assignment for each printed mail statement which exits or clears the printer means.

As related above, the matching means utilizes non-print code sequence commands within the print data stream which identify or indicate the beginning and end of each print data segment or set for each statement in the print data stream, and also utilizes non-print code sequence commands within the print data stream to provide an odd-even numeric assignment to each mail statement. The signaling and informing means preferably comprises a finishing interface device 40, associated with printer system 20, which physically transfers, in sequential manner, each printed page or sheet of each mail statement from the printer means to the post processing means. Finishing interface 40 generally includes circuitry which identifies the non-print command codes indicating the segment boundaries and odd/even numeric assignment for each statement. As related above, finishing interface 40 is interfaced with system controller computer 60, and signals or identifies the end of each printed mail statement to the system controller computer 60 with an END OF SET signal according to detected SPLIT=NOW code sequence commands in the print data stream. The END OF SET signals are transmitted to system controller computer 60 as the last printed sheet of each mail statement is being transferred from finishing interface 40 to post processing system 70. Finishing interface 40 also provides ON and OFF signals to system controller computer 60 regarding the odd-even numeric assignment of printed mail statements according to the non-print SF1 FUNCTION code sequence commands in the print data stream. The post processing data includes the sequential numeric assignment for each printed statement, and the parity of the odd/even numeric assignment signal from the finishing interface is matched with the parity of the statement number in the post processing data to correlate each printed statement with the corresponding post processing data. Programming, associated with system controller computer 60 as described above, utilizes the post processing data, END OF SET, and SF1 FUNCTION=ON or OFF signals, and provides for matching or correlating the post processing data received by system controller computer 60 from the from splitter device 45 with the printed mail statements as they are physically transferred or outputted from finishing interface 40 to the post processing system 70.

The matching step 540 also generally includes verification of the receipt of each complete printed statement by post processing system 70. Post processing system 70 is interfaced with system controller computer 60 by means of a plurality of communication links 100_a–c_, and a plurality of sensors 105_a–c_ are employed to monitor the post processing operations carried out by post processing system 70, as described above. Sensors 105_a–c_ provide system controller computer 60 with information regarding the position or location of each printed mail statement within post processing system 70, to allow correct timing of post processing operations. Upon detection by sensors 105_a–c_ of the receipt of each complete statement at a particular point in post processing system 70, such as collator 75, and upon receipt by system controller of the corresponding END OF SET signal for the complete statement, an acknowledgment signal is sent by system controller computer 60 to printer system 20 indicating that the printed statement transferred from finishing interface 40 has been successfully received without error, and that printer system 20 should continue output of printed statements. If system controller computer 60 has received an END OF SET signal and sensors 105_a–c_ do not detect receipt of the complete statement corresponding to the END OF SET signal within a set period of time, no acknowledgment signal is directed to printer system 20. If printer system does not receive the acknowledgment signal within a set period of time, printer system 20 is interrupted, and system controller computer 60 locates the beginning of the print data segment for the statement that is involved in the error which caused the interruption, so that, upon re-starting printer system 20, the first sheet to leave finishing interface 40 is the first sheet of the interrupted statement. Programming, associated with system controller computer 60, utilizes the post processing data from splitter device 45, the END OF SET and SHEET EXIT signals from finishing interface 40, and feedback from sensors 105*a*–*c*, to carry out the above-described verification in matching step 540.

At step 550, post processing operations are carried out by post processing system 70 under the direction and control of system controller computer 60, according to instructions in the post processing data retrieved by splitter device 45 in step 520. As described above, post processing system 70 generally includes conventional mail post processing devices such as collator 75 for collating printed mail statements transferred thereto from printer system 20, a buckle folder 80 for folding collated mail statements, an inserter apparatus 85 which includes a plurality of insert hoppers (not shown) for providing selective inserts to each mail statement, an envelope wetting and sealing apparatus 90 for sealing the stuffed envelopes, a postage metering device 95, and may contain additional or fewer post processing devices and apparatus. The manner of operation of the above post processing devices and apparatus 75–95 are well known in the art and need not be described further herein.

Accordingly, a mail assembly system and method has been disclosed which provides for post processing of a plurality of mailing pieces according to post processing data embedded within a stream of statement print data, which retrieves the post processing data from the statement print data for use by a system controller for post processing operations, and which matches the retrieved post processing data with the corresponding printed statements and performs post processing operations to provide complete mailing pieces. The invention thus avoids the use of printed identification codes on mail statements or other control documents and the scanning thereof for accessing post processing data, thereby avoiding the numerous drawbacks associated with background art mail assembly and processing systems and methods which rely on such use of printed identification codes.

The invention has now been explained with reference to specific embodiments. Although the above description contains many specificities, these should not be considered limiting, but as merely providing illustrations of the presently preferred embodiments of the invention. Other embodiments of the invention will be suggested by the foregoing disclosure to persons of ordinary skill in the relevant arts. Thus, the scope of the invention should be determined by the appended claims, and their legal equivalents.

What is claimed is:

1. A mail assembly system, comprising:

a) means for storing data, said data storage means having stored data records for a plurality of mailing pieces, said data records including statement print data for a plurality of mail statements, said data records including non-printable post processing data for said each of said mailing pieces, said post processing data embedded within said statement print data;

(b) means for retrieving said embedded post processing data from said statement print data in said data records;

(c) means for matching a plurality of printed statements with said post processing data retrieved by said retrieving means; and (d) computer means for system control, said computer means interfaced with said retrieving means, said computer means interfaced with said data storage means, said computer means interfaced with said matching means.

2. A mail assembly system according to claim 1, further comprising printer means for outputting a plurality of printed mail statements according to said statement print data, said printer means interfaced with said data storage means, said printer means interfaced with said computer means.

3. A mail assembly system according to claim 2, further comprising means for post processing said plurality of mailing pieces, said post processing means interfaced with said computer means, said post processing means interfaced with said printer means.

4. A mail assembly system according to claim 2, wherein said matching means further comprises means for providing an odd-even numeric assignment to each of said printed mail statements and for signaling said computer means of said odd-even numeric assignment for said each of said printed mail statements as said each of said printed mail statements exits said printer means.

5. A mail assembly system according to claim 2, wherein said matching means further comprises means for signaling said computer means of when the last printed sheet of said each of said mail statements has exited said printer means.

6. A mail assembly system according to claim 1, wherein said stored data records further comprise a first type of non-print code sequence commands identifying the beginning and end of the print data for said each of said mail statements in said statement print data.

7. A mail assembly system according to claim 1, wherein said stored data records further comprises a second type of non-print code sequence commands providing an odd-even numeric assignment for said each of said mail statements in said statement print data.

8. A mail assembly system according to claim 2, wherein said matching means further comprises programming, associated with said computer means, for matching the parity of said post processing data retrieved by said retrieving means with the parity of said each of said printed mail statements as said each of said printed mail statements exits said printing means.

9. A mail-assembly system according to claim 8, wherein said programming carries out the operations of:

a) identifying the exit of each said printed sheet from said printer means;

b) identifying the exit of the last said printed sheet of said each said mail statement from said printer means;

c) identifying an odd-even numeric assignment for each said printed mail statement to leave said printer means;

d) identifying said retrieved post processing from said retrieving means;

e) matching the parity of said post processing data retrieved by said retrieving means with a corresponding one of said each of said printed mail statements exiting said printer means; and f) repeating the above programming steps each time a said printed sheet exits said printer means.

10. A mail assembly system according to claim 3, wherein said matching means further comprises means for verifying receipt of said printed statements by said post processing means.

11. A mail assembly system, comprising:

a) means for storing data, said data storage means having stored data records for a plurality of mailing pieces, said data records including statement print data for a plurality of mail statements, said data record including non-printable post processing data for said each of said mailing pieces, said post processing data embedded within said statement print data;

(b) means for retrieving said embedded post processing data from said statement print data in said data records;

(c) means for matching a plurality of printed statements with said post processing data retrieved by said retrieving means;

(d) printer means for outputting a plurality of printed mail statements according to said statement print data, said printer means interfaced with said data storage means; and (e) computer means for system control, said computer means interfaced with said retrieving means, said computer means interfaced with said data storage means, said computer means interfaced with said matching means, said computer means interfaced with said printer means.

12. A mail assembly system according to claim 11, wherein said stored data records further comprise:

a) a first type of non-print code sequence commands identifying the beginning and end of the print data for said each of said mail statements in said statement print data; and b) a second type of non-print code sequence commands providing an odd-even numeric assignment for said each of said mail statements in said statement print data.

13. A mail assembly system according to claim 12, wherein said matching means further comprises:

a) means for signaling said computer means, according to said first type of non-print code sequence commands, that the last printed sheet of said each of said printed mail statements has exited said printer means; and b) means for providing an odd-even numeric assignment to each of said printed mail statements and for signaling said computer means, according to said second type of non-print code sequence commands, of said odd-even numeric assignment for said each of said printed mail statement as said each of said printed mail statements exits said printer means.

14. A mail assembly system according to claim 13, wherein said matching means further comprises programming, associated with said computer means and utilizing signals from said signaling means according to said first and second types of non-print code sequence commands, for matching the parity of said post processing data retrieved by said retrieving means with the parity of said each of said printed mail statements as said each of said printed mail statements exits said printing means.

15. A mail assembly system according to claim 14, wherein said programming carries out the operations of:

a) identifying the exit of each said printed sheet from said printer means;

b) identifying or the exit of the last said printed sheet of said each said mail statement from said printer means;

c) identifying an odd-even numeric assignment for each said printed mail statement to leave said printer means;

d) identifying said retrieved post processing from said retrieving means;

e) matching the parity of said post processing data retrieved by said retrieving means with a corresponding one of said each of said printed mail statements exiting said printer means; and f) repeating the above programming steps each time a said printed sheet exits said printer means.

16. A mail assembly system according to claim 13, further comprising means for post processing said plurality of mailing pieces, said post processing means interfaced with said computer means, said post processing means mechanically interfaced with said printer means for physical transfer of said printed mail statements.

17. A mail assembly system according to claim 16, wherein said matching means further comprises means for verifying receipt of said printed statements by said post processing means.

18. A mail assembly system, comprising:

a) means for storing data, said data storage means having stored data records for a plurality of mailing pieces, said data records including statement print data for a plurality of mail statements, said data records including non-printable post processing data for said each of said mailing pieces, said post processing data embedded within said statement print data, said data records including a first type of non-print code sequence commands identifying the beginning and end of the print data for each of said mail statements, said data records including a second type of non-print code sequence commands indicating an odd-even numeric assignment for said each of said mail statements;

b) means for retrieving said embedded post processing data from said statement print data in said data records;

c) means for matching a plurality of printed statements with said post processing data retrieved by said retrieving means;

d) printer means for outputting a plurality of printed mail statements according to said statement print data, said printer means interfaced with said data storage means; and e) computer means for system control, said computer means interfaced with said retrieving means, said computer means interfaced with said data storage means, said computer means interfaced with said matching means, said computer means interfaced with said printer means.

19. A mail assembly system according to claim 18, wherein said matching means further comprises:

a) means for signaling said computer means, according to said first type of non-print code sequence commands, that the last printed sheet of said each of said printed mail statements has exited said printer means; and b) means for providing an odd-even numeric assignment to each of said printed mail statements and for signaling said computer means, according to said second type of non-print code sequence commands, of said odd-even numeric assignment for said each of said printed mail statement as said each of said printed mail statements exits said printer means.

20. A mail assembly system according to claim 19, wherein said matching means further comprises programming, associated with said computer means and utilizing signals from said signaling means according to said first and second types of non-print code sequence commands, for matching the parity of said post processing data retrieved by said retrieving means with the parity of said each of said printed mail statements as said each of said printed mail statements exits said printing means, said programming carrying out the operations of:

a) identifying the exit of each said printed sheet from said printer means;

b) identifying or the exit of the last said printed sheet of said each said mail statement from said printer means;

c) identifying an odd-even numeric assignment for each said printed mail statement to leave said printer means;

d) identifying said retrieved post processing from said retrieving means;

e) matching the parity of said post processing data retrieved by said retrieving means with a corresponding one of said each of said printed mail statements exiting said printer means; and f) repeating the above programming steps each time a said printed sheet exits said printer means.

21. A mail assembly system according to claim 20, further comprising means for post processing said plurality of mailing pieces, said post processing means interfaced with said computer means, said post processing means mechanically interfaced with said printer means for physical transfer of said printed mail statements.

22. A mail assembly system according to claim 21, further comprising sensor means for monitoring the presence and location of said printed statements within said post processing means, said sensor means interfaced with said computer means.

23. A mail assembly system according to claim 22, wherein said matching means further comprises means for verifying receipt of said printed statements by said post processing means.

24. A mail assembly system according to claim 23, wherein said verifying means comprises programming, associated with said computer means and utilizing said retrieved post processing data, feedback from said sensor means, and signals from said signaling means according to said first and second types of non-print code sequence commands, for verifying receipt of said printed statements by said post processing means, for interrupting said printer means upon failure to verify said receipt of said printed statements by said post processing means after a set period of time, and for locating a point in said statement print data corresponding to the beginning of the last printed statement outputted by said printer means.

25. A mail assembly method, comprising the steps of:

a) forming and storing data records for a plurality of mailing pieces, said data records including statement print data for a plurality of mail statements, said data records including non-printable post processing data for each of said plurality of mailing pieces, said post processing data embedded within said statement print data;

b) providing said statement print data and said embedded post processing data to printer means for printing said plurality of mail statements;

c) retrieving said post processing data from said statement print data; and d) matching said retrieved post processing data for each of said mailing pieces with a corresponding printed mail statement.

26. A mail assembly method as recited in claim 25, further comprising the step of printing said plurality of mail statements, said printing carried out by printer means for outputting a plurality of printed mail statements.

27. A mail assembly method as recited in claim 26, further comprising the step of directing said retrieved post processing data to computer means for system control.

28. A mail assembly method as recited in claim 27, further comprising the step of transferring said printed mail statements from printer means to means for post processing said plurality of mailing pieces.

29. A mail assembly method as recited in claim 28, wherein said matching step further comprises the step of informing said computer means when the last printed sheet of each of said printed mail statements has been transferred from said printer means to said post processing means.

30. A mail assembly method as recited in claim 29, wherein said matching step further comprises the step of providing an odd-even numeric assignment to said each of said mail statements and informing said computer means, when each said printed mail statement is transferred from said printer means to said post processing means, whether said each said printed statement has an even numeric assignment or an odd numeric assignment.

31. A mail assembly method as recited in claim 30, wherein said matching step further comprises the step of correlating, by said computer means, the parity of each said printed statement transferred from said printing means with the parity of said retrieved post processing data.

32. A mail assembly method as recited in claim 31, further comprising the step of performing post processing operations, by said post processing means, for each of said mailing pieces according to said retrieved post processing data.

33. A mail assembly method as recited in claim 32, wherein said matching step further comprises the step of verifying receipt of said printed statements by said post processing means.

34. A mail assembly method as recited in claim 33, wherein said verifying step further comprises the steps of interrupting said printing step upon failure to verify said receipt of said printed statements by said post processing means, and locating, in said statement print data, the beginning of the print data for the last statement printed before said interruption step.

35. A mail assembly method, comprising the steps of:

a) forming and storing data records for a plurality of mailing pieces, said data records including statement print data for a plurality of mail statements, said data records including non-printable post processing data for each of said plurality of mailing pieces, said post processing data embedded within said statement print data, said data records including a first type of non-print code sequence commands identifying the beginning and end of the print data for each of said mail statements, said data records including a second type of non-print code sequence commands indicating an odd-even numeric assignment for said each of said mail statements;

b) providing said statement print data and said embedded post processing data to printer means for printing said plurality of mail statements;

c) retrieving said post processing data from said statement print data;

d) matching said retrieved post processing data for each of said mailing pieces with a corresponding printed mail statement;

e) printing said plurality of mail statements, said printing carried out by printer means for outputting a plurality of printed mail statements;

f) transferring said printed mail statements from printer means to means for post processing said plurality of mailing pieces; and g) directing said retrieved post processing data to computer means for system control.

36. A mail assembly method as recited in claim 35, wherein said matching step further comprises the step of informing said computer means, according to said first type of non-print code sequence commands in said data records, when the last printed sheet of each of said printed mail statements has been transferred from said printer means to said post processing means.

37. A mail assembly method as recited in claim 36, wherein said matching step further comprises the step of providing an odd-even numeric assignment to said each of said mail statements according to said second type of non-print code sequence commands in said data record, and informing said computer means, when each said printed mail statement is transferred from said printer means to said post processing means, whether said each said printed statement has an even numeric assignment or an odd numeric assignment.

38. A mail assembly method as recited in claim 37, wherein said matching step further comprises the step of correlating, by said computer means, the parity of each said printed statement transferred from said printing means with the parity of said retrieved post processing data.

39. A mail assembly method as recited in claim 38, further comprising the step of performing post processing operations, by said post processing means, for each of said mailing pieces according to said retrieved post processing data.

40. A mail assembly method as recited in claim 39, wherein said matching step further comprises the step of verifying receipt of said printed statements by said post processing means.

41. A mail assembly method as recited in claim 40, wherein said verifying step further comprises the steps of interrupting said printing step upon failure to verify said receipt of said printed statements by said post processing means, and locating, in said statement print data, the beginning of the print data for the last statement printed before said interruption step.

* * * * *

UNITED STATES PATENT AND TRADEMARK OFFICE
CERTIFICATE OF CORRECTION

PATENT NO : 5,726,897

DATED : March 10, 1998

INVENTOR(S) : Christian E. Tammi, Daniel M. Saldana and Marc J. Fagan

It is certified that error appears in the above-identified patent and that said Letters Patent is hereby corrected as shown below:

On title page, item 73 Assignee
replace "United States Computer Services, Sacramento, Calif."
with --International Billing Services, Inc., Rancho Cordova, Calif.--.

Signed and Sealed this

Eleventh Day of August 1998

Attest:

BRUCE LEHMAN

*Attesting Officer*

*Commissioner of Patents and Trademarks*